(12) United States Patent
Murdoch

(10) Patent No.: US 11,835,099 B2
(45) Date of Patent: Dec. 5, 2023

(54) ELECTROMECHANICAL STORM BRAKE ACTUATOR

(71) Applicant: PORTAL CRANE PARTS LTD., Port Coquitlam (CA)

(72) Inventor: Allan Roy Murdoch, Kelowna (CA)

(*) Notice: Subject to any disclaimer, the term of this patent is extended or adjusted under 35 U.S.C. 154(b) by 657 days.

(21) Appl. No.: 16/485,387

(22) PCT Filed: Feb. 9, 2018

(86) PCT No.: PCT/CA2018/000026
§ 371 (c)(1),
(2) Date: Aug. 12, 2019

(87) PCT Pub. No.: WO2018/145196
PCT Pub. Date: Aug. 16, 2018

(65) Prior Publication Data
US 2019/0390723 A1    Dec. 26, 2019

Related U.S. Application Data

(60) Provisional application No. 62/457,168, filed on Feb. 10, 2017.

(51) Int. Cl.
*F16D 59/00* (2006.01)
*B66C 9/18* (2006.01)
(Continued)

(52) U.S. Cl.
CPC ............... *F16D 59/00* (2013.01); *B66C 9/18* (2013.01); *F16D 63/008* (2013.01); *F16D 65/06* (2013.01);
(Continued)

(58) Field of Classification Search
CPC ........ F16D 59/00; F16D 63/008; F16D 65/16; F16D 2121/26; F16D 2127/06; B66C 9/18; H02K 7/106; H02K 49/108
See application file for complete search history.

(56) References Cited

U.S. PATENT DOCUMENTS 7,896,139 B2 * 3/2011 Syrman ..................... B66B 5/18
188/44
2010/0108447 A1    5/2010 Lahteenmaki et al.
(Continued)

FOREIGN PATENT DOCUMENTS

CN    106246765 A  * 12/2016
CN    205945486 U  *  2/2017
(Continued)

OTHER PUBLICATIONS

International Search Report and Written Opinion issued by the International Searching Authority in relation to corresponding International Application No. PCT/CA2018/000026 dated May 4, 2018, 8 pgs.

*Primary Examiner* — Melanie Torres Williams
(74) *Attorney, Agent, or Firm* — Gina M. Lupino

(57) ABSTRACT

Electromechanical actuator mechanisms for storm brakes are provided. The actuator mechanisms generally comprise an electro-mechanical release system and a permanent magnet eddy current brake system with adjustable air gap for varying brake setting time, and for energy dissipation of the storm brake main spring force or weight.

4 Claims, 3 Drawing Sheets

(51) Int. Cl.
  *F16D 63/00* (2006.01)
  *F16D 65/06* (2006.01)
  *F16H 25/22* (2006.01)
  *H02K 7/06* (2006.01)
  *H02K 7/106* (2006.01)
  *H02K 7/116* (2006.01)
  *H02K 49/10* (2006.01)
  *F16D 121/26* (2012.01)
  *F16D 125/40* (2012.01)
  *F16D 127/06* (2012.01)

(52) U.S. Cl.
  CPC ........... *F16H 25/2204* (2013.01); *H02K 7/06* (2013.01); *H02K 7/106* (2013.01); *H02K 7/116* (2013.01); *H02K 49/108* (2013.01); *F16D 2121/26* (2013.01); *F16D 2125/40* (2013.01); *F16D 2127/06* (2013.01)

(56) References Cited

U.S. PATENT DOCUMENTS

| 2011/0180362 | A1* | 7/2011 | Swanson | F16D 25/082 |
| | | | | 192/66.1 |
| 2013/0140112 | A1 | 6/2013 | Watler et al. | |
| 2016/0281807 | A1* | 9/2016 | Kaufman | F16D 65/853 |
| 2016/0347592 | A1* | 12/2016 | Golder | B66D 3/22 |
| 2017/0043657 | A1* | 2/2017 | Schmitt | F16D 25/087 |

FOREIGN PATENT DOCUMENTS

DE  202017107799 U1  4/2018
WO  2010108484 A1  9/2010

* cited by examiner

ELECTROMECHANICAL STORM BRAKE ACTUATOR

TECHNICAL FIELD

In embodiments of the presently described subject matter, there are provided electromechanical actuator mechanisms for storm brakes.

BACKGROUND

Storm brakes are devices that are used for braking and securing large pieces of rail-mounted equipment against wind loads, and may be subdivided into several general types. These include: rail clamps, which grip the sides of the rail; rail brakes, which press against the top of the rail; wheel brakes, which are applied against the sides of steel wheels on the rail; and various kinds of wheel chocks.

Most storm brakes are spring applied, with their major braking forces generated by the direct or mechanically multiplied action of the main brake springs. However, there are also self-actuating storm brakes (e.g. wheel chocks) that are spring or weight applied where the major braking forces are generated by wedging or toggle effects. In any case, hydraulic systems are typically used in prior known storm brakes to provide the forces and motion required to release the brake from a brake set position and into a brake release position. Most of the hydraulic systems currently in use employ some type of solenoid valve to hold the spring load or weight when the storm brake is in the release position, with check valves used to allow free passage of hydraulic oil in one direction.

There is currently a movement in industry to eliminate hydraulic systems from equipment for environmental, efficiency, cleanliness and serviceability reasons. As a result, there is a need for electromechanical actuator mechanisms for storm brakes to provide the sometimes large necessary forces and force-holding that are currently provided by hydraulic systems and cylinders.

SUMMARY

In embodiments of the presently disclosed subject matter, there are provided electromechanical actuator mechanisms for storm brakes. The actuator mechanisms generally comprise an electro-mechanical release system and a permanent magnet eddy current brake system with adjustable air gap for varying brake setting time, and for energy dissipation of the storm brake main spring force or weight.

In some embodiments, the storm brake actuator comprises a ball screw for the efficient generation of large linear forces (such as may be required to compress the main brake springs or lift the brake weight of a storm brake) when powered by an electric motor. The ball screw is rotated via a gear train drive assembly having a selected suitable number of stages to provide the torque multiplication required to enable the motor to operate the ball screw to compress the main brake springs or to lift the brake weight of a storm brake. The gear train drive assembly preferably also comprises a conventional torque overload clutch (either friction type or detent type) to protect the shafts and other connecting components thereof from momentary overloads.

An electrically powered brake mechanism is operatively connected to the gear train or to the electric motor of the actuator in order to effectively hold the load of the main brake spring or the brake weight when the storm brake is in its release position (i.e. when the actuator has released the storm brake in order to permit movement of the rail-mounted equipment). When the storm brake has reached its release position, the electric motor is turned off (e.g. by a limit switch) and a brake coil affixed to the actuator housing is energized to create a powerful magnetic field that pulls a steel armature plate in splined connection with the gear train or the electric motor towards it with substantial force. Preferably, the brake coil poles are fitted with friction material to provide increased friction.

The safety nature of storm brake products requires that their setting (i.e. into a brake set position) be achieved in a reliable and efficient manner. However, setting of the brake (and the dissipation of brake main spring or weight energy) must also be achieved in a controlled and preferably time adjustable manner in order to prevent the generation and action of large inertial forces on the storm brake components, and in the case of an electromechanical actuator also the acceleration of the electric drive motor to a damaging level or possible destruction. In prior known hydraulically powered storm brakes, this dissipation and control is usually accomplished by metering oil form a hydraulic cylinder through a fine needle valve or orifice.

In the presently described electromechanical actuator, a permanent magnet, adjustable torque eddy current brake is employed to provide these functions. In a preferred embodiment, a shaft extension of the electric motor turns a preferably aluminum eddy current disc through a one-way clutch, which allows the electric motor to turn the entire drive system unencumbered (i.e. overrunning) by eddy current brake torque when compressing brake main springs or lifting brake main weight during retraction of the storm brake into its release position.

However, when the storm brake is setting, the one-way clutch now spins the eddy current disc at full shaft speed. The eddy current disc is rotated facing an array of high strength rare earth magnets that have alternating north/south poles and that are attached, preferably within corresponding pockets, to a rotationally-stationary steel alloy disc. The rotationally-stationary disc is connected to an adjusting screw that passes through a threaded opening in a cap of the actuator housing. This allows adjustment of the axial position of the rotationally-stationary disc relative to the eddy current disc, thereby providing an adjustable air gap between the discs. Adjusting the air gap increases or decreases the magnetic field strength penetrating the eddy current disc. The eddy currents and resultant torque produced in this arrangement vary with differential rotation speed and field strength; zero torque is produced at zero differential speed.

When all power is turned off, the electric motor brake is released and the electric motor shaft is rotated by the back-driving of the main power springs or weight of the storm brake. Motor speed increases until an equivalent torque is generated in the eddy current brake. By adjusting the air gap, the torque/speed relationship is infinitely variable, thereby allowing an adjustably varying setting time of the storm brake. A jam nut may be used to lock the resultant storm brake setting time adjustment in place.

It is known that eddy current brakes can be designed with a steel backing plate mounted in conjunction with a rotating aluminum eddy current disc in order to provide a more concentrated magnetic flux and greater torque. However, although such an arrangement may be employed in embodiments where higher torques are necessary, the addition of a steel backing plate adds substantial rotational inertial to the high speed rotating parts of the eddy current brake, and results in strong attractive forces which must be handled with additional thrust bearings. A further benefit of an aluminum-only eddy current disc versus one with a steel backing, which is more customary, is that the aluminum-only disc cancels out push and pull lines of force effects. In preferred embodiments, a relatively thicker aluminum eddy current disc with relatively long air gap and lower field strength (as compared to a more typical steel backed eddy conductor) is accordingly employed, despite marginally lower performance, so as to: (a) reduce thrust forces between moving parts due to push/pull magnetic force cancellation; (b) reduce inertial mass; and (c) enhance simplicity of construction.

BRIEF DESCRIPTION OF THE DRAWINGS

For a fuller understanding of the nature and advantages of the disclosed subject matter, as well as the preferred modes of use thereof, reference should be made to the following detailed description, read in conjunction with the accompanying drawings. In the drawings, like reference numerals designate like or similar steps or parts.

DETAILED DESCRIPTION OF SPECIFIC EMBODIMENTS

The following description of specific embodiments is merely exemplary in nature and is in no way intended to limit the invention, its application, or uses. The storm brake actuators of the present invention may take form in a number of different embodiments depending upon the particular requirements of the use, such as the nature of the storm brake to be actuated, and weight and size of the rail-mounted equipment to be anchored.

Figure 1:
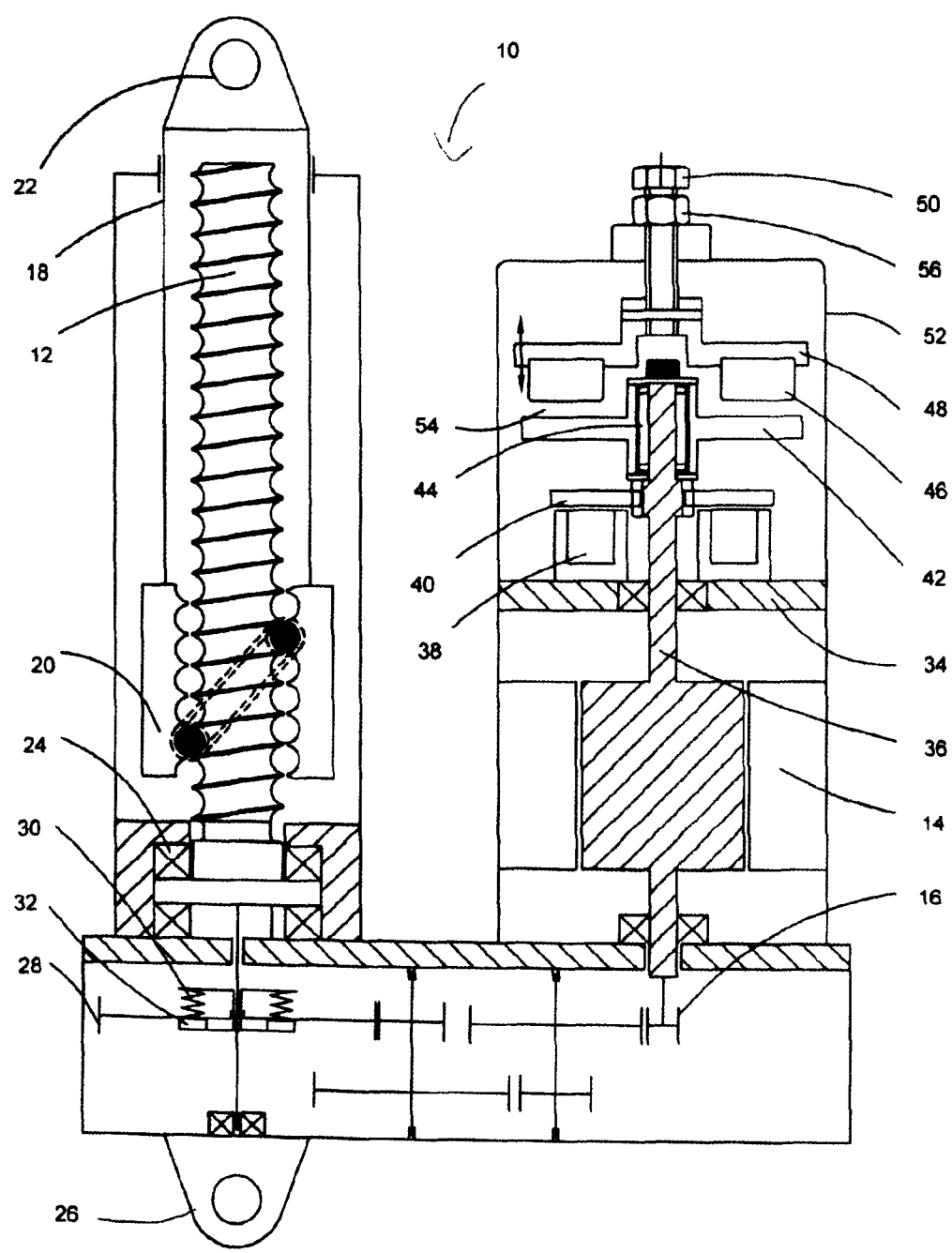
FIG. 1 is a schematic cross-sectional view taken along the midline of a storm brake actuator 10 according to one embodiment of the presently described subject matter.
Figure 2:
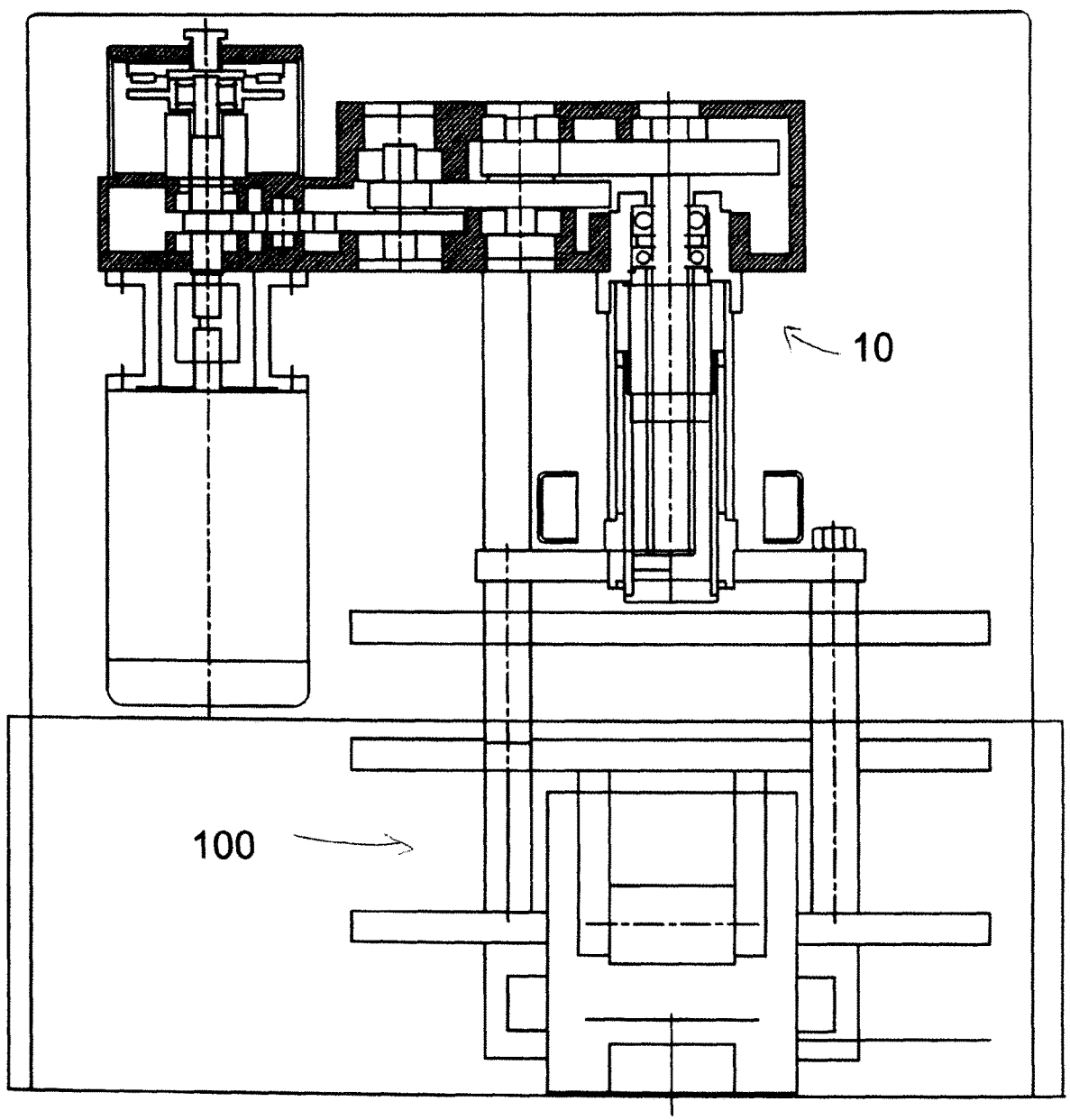
FIG. 2 is a schematic cross-sectional view of the storm brake actuator of FIG. 1, operatively connected to a representative rail clamp 100. The orientation of the storm brake actuator in FIG. 2 is opposite (i.e. upside down) relative to the orientation of the storm brake actuator in FIG. 1.
Figure 3:
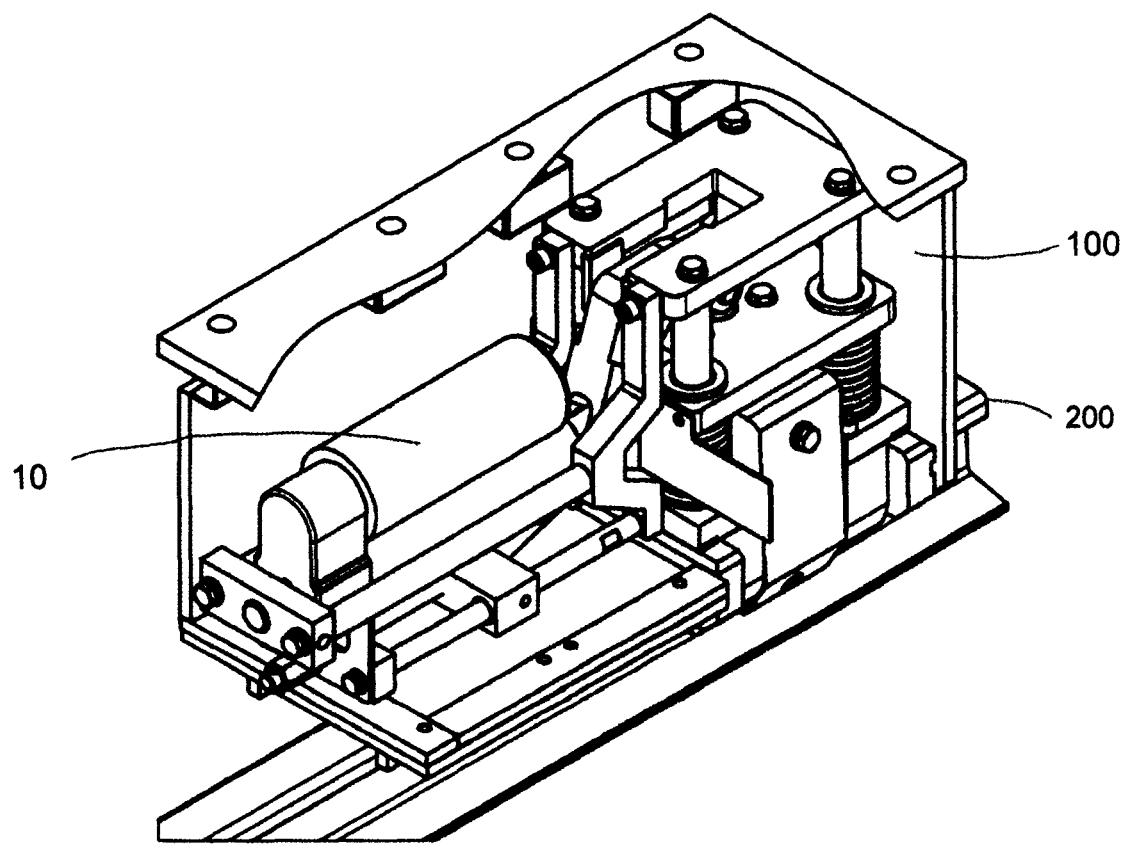
FIG. 3 is a perspective view, partially in section, of a representative rail clamp 100 comprising an alternatively configured embodiment of a storm brake actuator 10, illustrating rail clamp 100 over a representative rail 200.

As best seen in FIG. 1, representative storm brake actuator 10 comprises a ball screw 12 for the efficient generation of large linear forces (such as may be required to compress the main brake springs or lift the brake weight of a storm brake) when powered by an electric motor 14. The ball screw 12 is rotated via a gear train drive assembly 16 having a selected suitable number of stages to provide the torque multiplication required to enable the motor 14 to operate the ball screw 12 to compress the main brake springs or to lift the brake weight of a storm brake.

An output tube 18 is affixed at one end to a recirculating ball nut assembly 20 that is operatively mounted on the ball screw 12, and comprises a connector 22 at its opposite end for connection, either directly or via suitable mechanical linkage, to the main brake springs or weight of the storm brake. This connection of the output tube 18 to the storm brake main springs prevents rotation of the tube 18 and the ball nut assembly 20 together with the ball screw 12, and rotation of the ball screw 12 accordingly generates a longitudinal force and movement of the output tube 18 (and ball nut assembly 20) relative to the actuator 10. Reversing rotational direction of electric motor 14 reverses the linear movement of the output tube 18. Output thrust forces and radial gear forces acting on ball screw 12 when in use are accommodated by suitable bearings 24 located between the ball screw 12 and the actuator housing. At least one connector 26 is provided on the external housing of actuator 10 in order to rigidly mount the actuator 10 to a storm brake (and thus provide a base against which output tube 18 may be longitudinally extended or retracted).

The gear train drive assembly 16 of storm brake actuator 10 comprises a torque overload clutch to protect the shafts and other connecting components thereof from momentary overloads. This can take the form of a friction type clutch or a detent type clutch placed at a suitable location within the gear train 16. Detent type clutches are typically more reliable in lubricated environments, but a friction type clutch is illustrated for explanation purposes. In the illustrated embodiment, the friction type coupling is associated with the output gear 28 of gear train 16, and comprises spring plate 30 that is operatively connected to the ball screw 12 and applies a preset load against a friction surface 32 of output gear 28.

An electrically powered brake mechanism 34 is operatively connected to the gear train 16 or to the electric motor 14 of the actuator 10 in order to effectively hold the load of the main brake spring or brake weight when the storm brake is in its release position (i.e. when the actuator has released the storm brake in order to permit movement of the rail-mounted equipment). In the illustrated embodiment, the electric brake 34 is formed around an extension 36 of the drive shaft of electric motor 14 located opposite gear train drive assembly 16. When the storm brake has reached its release position, electric motor 14 is turned off by a limit switch and brake coil 38 affixed to the actuator housing is energized, creating a powerful magnetic field that pulls a steel armature plate 40 towards it with substantial force. Preferably, the brake coil poles are fitted with friction material to provide increased friction. The brake armature plate 40 has a splined connection with the drive shaft extension 36, thereby transferring electric brake torque to the shaft of motor 14, and thereby holding the storm brake main spring load when electric brake 34 is engaged.

The safety nature of storm brake products requires that their setting (i.e. into a brake set position) be achieved in a reliable and efficient manner. However, setting of the brake (and the dissipation of brake main spring or weight energy) must also be achieved in a controlled and preferably time adjustable manner in order to prevent the generation and action of large inertial forces on the storm brake components, and in the case of an electromechanical actuator also the acceleration of the electric drive motor to a damaging level or possible destruction. In prior known hydraulically powered storm brakes, this dissipation and control is usually accomplished by metering oil form a hydraulic cylinder through a fine needle valve or orifice.

In the presently described electromechanical actuator 10, a permanent magnet, adjustable torque eddy current brake is employed to provide these functions. Shaft extension 36 of motor 14 turns a preferably aluminum eddy current disc 42 through a one-way clutch 44, which allows the motor 14 to turn the entire drive system unencumbered (i.e. overrunning) by eddy current brake torque when compressing brake main springs or lifting brake main weight during retraction of the storm brake into its release position.

However, when the storm brake is setting, the one-way clutch 44 now spins the eddy current disc 42 at full shaft speed. The eddy current disc 42 is rotated facing an array of high strength rare earth magnets 46 that have alternating north/south poles and that are attached, preferably within corresponding pockets, to a rotationally-stationary steel alloy disc 48. The rotationally-stationary disc 48 is connected to an adjusting screw 50 that passes through a threaded opening in a cap 52 of the actuator housing. This allows adjustment of the axial position of the rotationally-stationary disc 48 relative to the eddy current disc 42, thereby providing an adjustable air gap 54 between discs 48 and 42. Adjusting the air gap 54 increases or decreases the magnetic field strength penetrating the eddy current disc 42. The eddy currents and resultant torque produced in this arrangement vary with differential rotation speed and field strength. It should be noted that zero torque is produced at zero differential speed.

When all power is turned off, the electric motor brake 34 is released and the motor shaft 14 is rotated by the back-driving of the main power springs or weight of the storm brake. Motor speed increases until an equivalent torque is generated in the eddy current brake. By adjusting the air gap 54, the torque/speed relationship is infinitely variable, thereby allowing an adjustably varying setting time of the storm brake. A jam nut 56 may be used to lock the resultant storm brake setting time adjustment in place.

It is known that eddy current brakes can be designed with a steel backing plate mounted in conjunction with a rotating aluminum eddy current disc in order to provide a more concentrated magnetic flux and greater torque. However, although such an arrangement may be employed in embodiments where higher torques are necessary, the addition of a steel backing plate adds substantial rotational inertial to the high speed rotating parts of the eddy current brake, and results in strong attractive forces which must be handled with additional thrust bearings.

A further benefit of an aluminum-only eddy current disc 42 versus one with a steel backing, which is more customary, is that the aluminum-only disc cancels out push and pull lines of force effects. In preferred embodiments, a relatively thicker aluminum eddy current disc 42 with relatively long air gap and lower field strength (as compared to a more typical steel backed eddy conductor) is accordingly employed, despite marginally lower performance, so as to: (a) reduce thrust forces between moving parts due to push/pull magnetic force cancellation; (b) reduce inertial mass; and (c) enhance simplicity of construction.

The present description is of the best presently contemplated mode of carrying out the subject matter disclosed herein. The description is made for the purpose of illustrating the general principles of the subject matter and not to be taken in a limiting sense; the described subject matter can find utility in a variety of implementations without departing from the scope of the invention made, as will be apparent to those of skill in the art from an understanding of the principles that underlie the invention.

The invention claimed is:

1. A storm brake actuator comprising an electro-mechanical release system and a permanent magnet eddy current brake system with adjustable air gap for varying brake setting time, and for spring or weight energy dissipation.

2. The storm brake actuator of claim 1, wherein the eddy current brake system comprises an aluminum eddy current disc.

3. A storm brake comprising the storm brake actuator of claim 1, further comprising a ball screw assembly and a gear train drive assembly for generating high linear forces, and an electric motor to compress main brake springs or lift a brake weight of the storm brake.

4. A storm brake comprising the storm brake actuator of claim 1 and an electrically powered brake mechanism for holding the storm brake in a released position and allowing setting of the storm brake on loss of power.

* * * * *